(12) United States Patent
Kvisteroy

(10) Patent No.: US 7,501,302 B2
(45) Date of Patent: Mar. 10, 2009

(54) ELECTROMAGNETIC MICRO-GENERATOR AND METHOD FOR MANUFACTURING THE SAME

(75) Inventor: Terje Kvisteroy, Horten (NO)

(73) Assignee: Infineon Technologies Sensonor AS, Horten (NO)

(*) Notice: Subject to any disclaimer, the term of this patent is extended or adjusted under 35 U.S.C. 154(b) by 85 days.

(21) Appl. No.: 11/685,031

(22) Filed: Mar. 12, 2007

(65) Prior Publication Data

US 2007/0231944 A1 Oct. 4, 2007

(30) Foreign Application Priority Data

Mar. 28, 2006 (EP) .................. 06111810

(51) Int. Cl.
*H01L 21/00* (2006.01)

(52) U.S. Cl. .............. 438/52; 438/3; 438/48; 257/E29.167; 257/E43.001

(58) Field of Classification Search .............. 438/3, 438/48, 52; 257/295, 427, E43.001, E29.167
See application file for complete search history.

(56) References Cited

U.S. PATENT DOCUMENTS

| 6,083,802 A * | 7/2000 | Wen et al. ............... 438/381 |
| 2003/0003603 A1 * | 1/2003 | Chaudhry et al. ........ 438/3 |

* cited by examiner

*Primary Examiner*—Walter L Lindsay, Jr.
*Assistant Examiner*—Abdulfattah Mustapha
(74) *Attorney, Agent, or Firm*—Edell, Shapiro & Finnan, LLC

(57) ABSTRACT

A micro-generator includes an integrated circuit (IC) wafer. A micro-electro mechanical system (MEMS) wafer, with a movable micromechanical element, is bonded to the IC wafer. A plurality of first metal coils associated with a plurality of trenches is arranged in one of the IC wafer and the MEMS wafer. A plurality of micro-magnets is provided in the other of the IC wafer and the MEMS wafer. Each micro-magnet is associated with a respective trench and is formed from a magnet layer deposited, plated or bonded to the MEMS wafer or IC wafer. Movement of the micro-mechanical element generates a voltage in the first metal coils.

6 Claims, 3 Drawing Sheets

ELECTROMAGNETIC MICRO-GENERATOR AND METHOD FOR MANUFACTURING THE SAME

CROSS REFERENCE TO RELATED APPLICATIONS

This application claims priority under 35 U.S.C. §119 to Application No. EP 06111810.5 filed on Mar. 28, 2006, entitled "Electromagnetic Micro-Generator," the entire contents of which are hereby incorporated by reference.

FIELD OF THE INVENTION

The present invention relates to a micro-generator for generating useful electrical power from the external environment and a corresponding method of manufacturing a micro generator.

BACKGROUND

Many types of devices are currently known that require the ability to communicate with other devices. More and more systems using such communicating devices are employing wireless technology so that communication can be carried out without cables or wires.

As wireless technology becomes more widespread, future devices such as sensors, intelligent nodes, and remote control systems will rely heavily upon wireless technology to provide them with power as well as for communication purposes.

Micromechanical systems need alternatives to batteries for providing power which meets the miniaturization requirements of such systems. However, to date there have not been any suitable power supply solutions that are on a small enough scale to be adequately integrated with micro systems. For example, in current systems traditional piezoelectric bulk material may be glued or soldered on to other mechanical members and electrically joined by soldering or a combination of soldering and wire bonding.

SUMMARY

The invention provides a low-cost, fully-integrated micro-generator which is compatible with integrated circuit technology.

The micro-generator according to an exemplary embodiment of the present invention comprises: an integrated circuit (IC) wafer, a microelectromechanical system (MEMS) wafer with a movable micromechanical element, a plurality of first metal coils, a plurality of trenches, and a plurality of micro-magnets. The microelectromechanical system (MEMS) wafer is bonded to the IC wafer. The first metal coils are realized as part of the IC wafer and/or the MEMS wafer. The trenches are formed in the IC wafer and/or the MEMS wafer and associated with the first coils. Each micro-magnet is associated with a respective trench, wherein the micro-magnets are formed from a magnet layer deposited or plated or bonded to the MEMS wafer and/or the IC wafer. The micro-magnets are arranged to move, in response to the movement of the micromechanical element, within the trenches relative to the first coils such that a voltage is induced in the first coils.

Also described herein is a method of manufacturing a micro-generator, the method comprising: forming a plurality of first metal coils as part of an integrated circuit (IC) wafer and/or MEMS wafer, the MEMS wafer comprising a moveable micromechanical element; forming a plurality of trenches associated with the first coils in the IC wafer and/or MEMS wafer; depositing or plating or bonding a layer of magnetic material to the MEMS wafer and/or the IC wafer; etching or abbreviating the magnetic layer to form plurality of micro-magnets, a micro-magnet being associated with each trench; bonding the MEMS wafer to the IC wafer to define a micro-generator wafer such, upon movement of the micro-mechanical element, the micro-magnets move within the trenches relative to the metal coils such that a voltage is induced in the first coils; and dicing the micro-generator wafer to form individual micro-generators.

Furthermore, described herein is a micro-transformer for a micro-generator, the transformer comprising: a plurality of first metal coils and a plurality of second metal coils associated with the first coils, the first and second coils being realized as part of an IC or MEMS wafer, a first voltage being inducible in the first coils in use by the micro-generator; and magnetic material realized as part of an IC or MEMS wafer, wherein the coils and magnetic material are arranged such that a first voltage induced in use in the first coils causes a second voltage to be induced in the second coils, wherein the second voltage is larger than the first voltage.

The above and still further features and advantages of the present invention will become apparent upon consideration of the following definitions, descriptions and descriptive figures of specific embodiments thereof, wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

The electromagnetic micro-generator and method for manufacturing the same are explained in more detail below with reference to the accompanying drawings, where.

DETAILED DESCRIPTION

Figure 1:
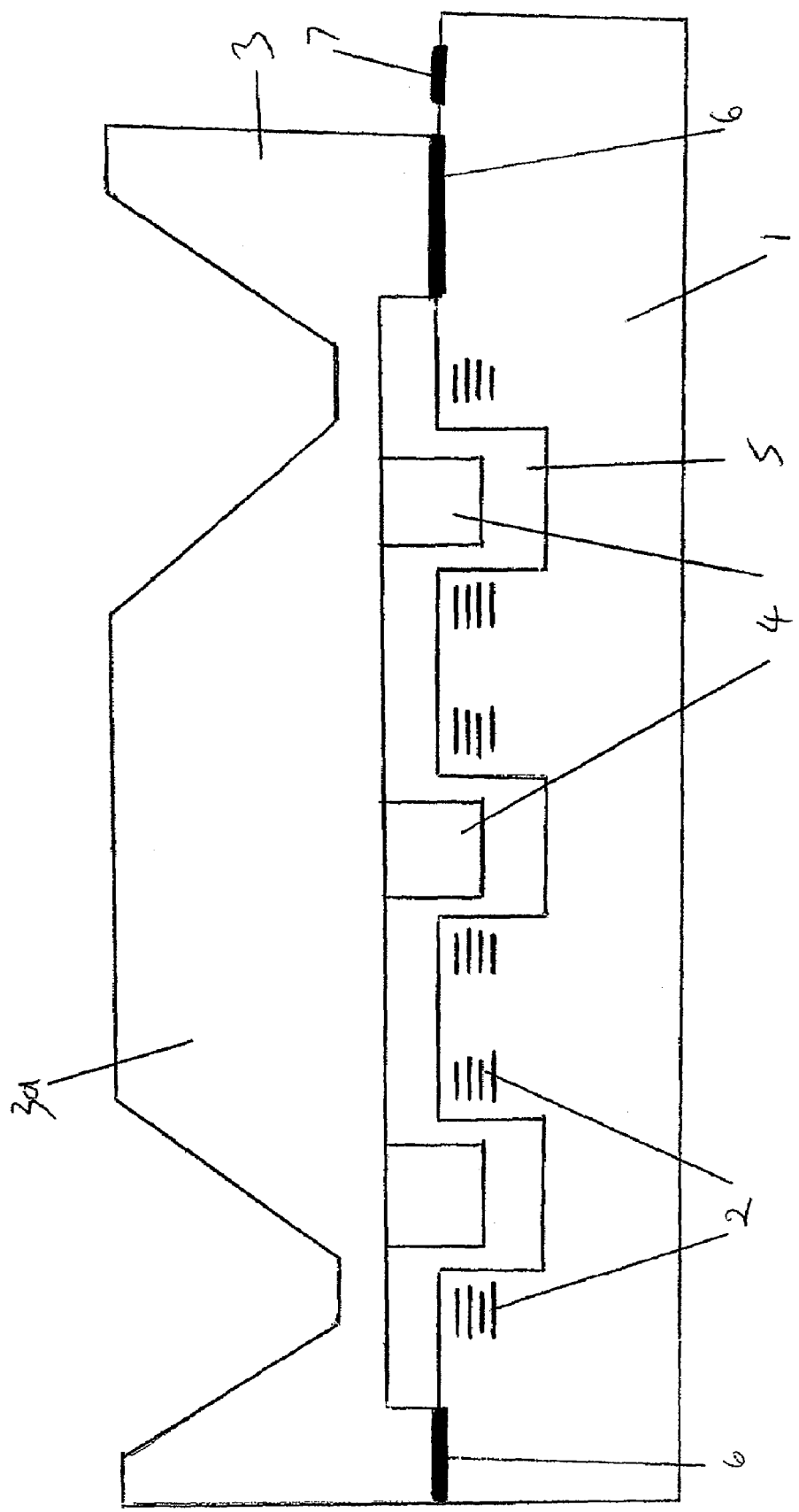
FIG. 1 illustrates a micro-generator according to an exemplary embodiment of the invention.

Referring to FIG. 1, an exemplary embodiment of an electromagnetic micro-generator according to the present invention comprises an integrated circuit (IC) chip 1 with a plurality of metal micro-coils 2 within the chip 1. The coils 2 are realized as part of the IC chip 1 and are coupled in series. The micro-generator also comprises a microelectromechanical system (MEMS) chip 3 including an energy pick-up such as a mass-spring system 3a or a diaphragm (not shown). A plurality of micro-magnets 4 are formed on the MEMS chip 3, and a plurality of trenches 5 are formed in the IC chip 1 to accommodate the magnets 4. The coils 2 and magnets 4 are positioned within the IC chip 1 such that the magnets 4 can move within the trenches 5 close to the coils 2 to induce a current in the coils 2. In the example shown, the magnets 4 surround the trenches 5. The MEMS chip 3 and IC chip 1 are bonded together at the bond regions 6 shown in FIG. 1. Bond pads 7 are formed on the IC chip 1.

Figure 2A:
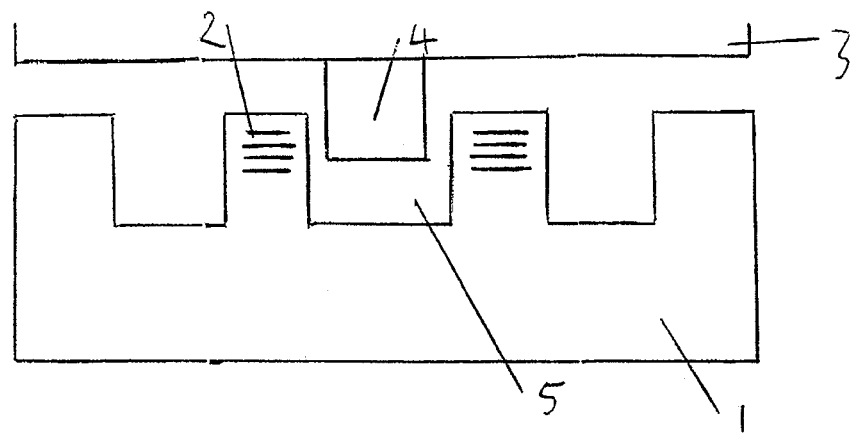
FIGS. 2A to 2C illustrate examples of different coil and magnet arrangements possible in the micro-generator shown in FIG. 1.
Figure 2B:
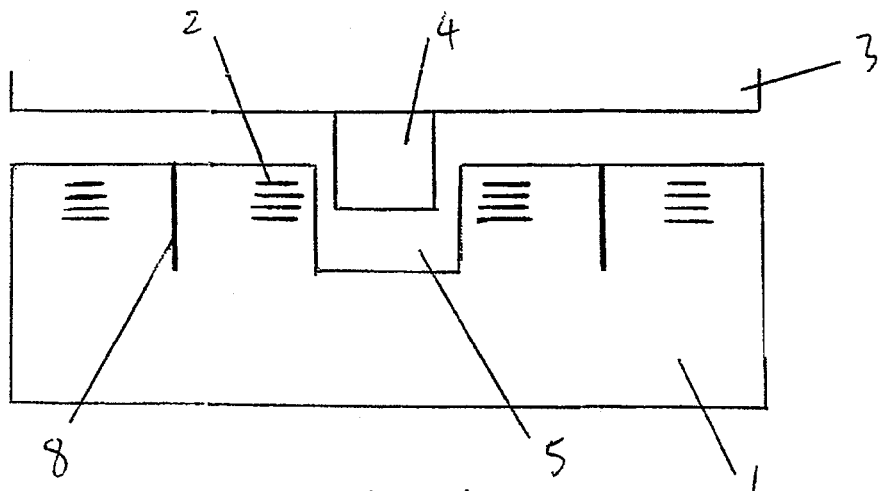
Figure 2C:
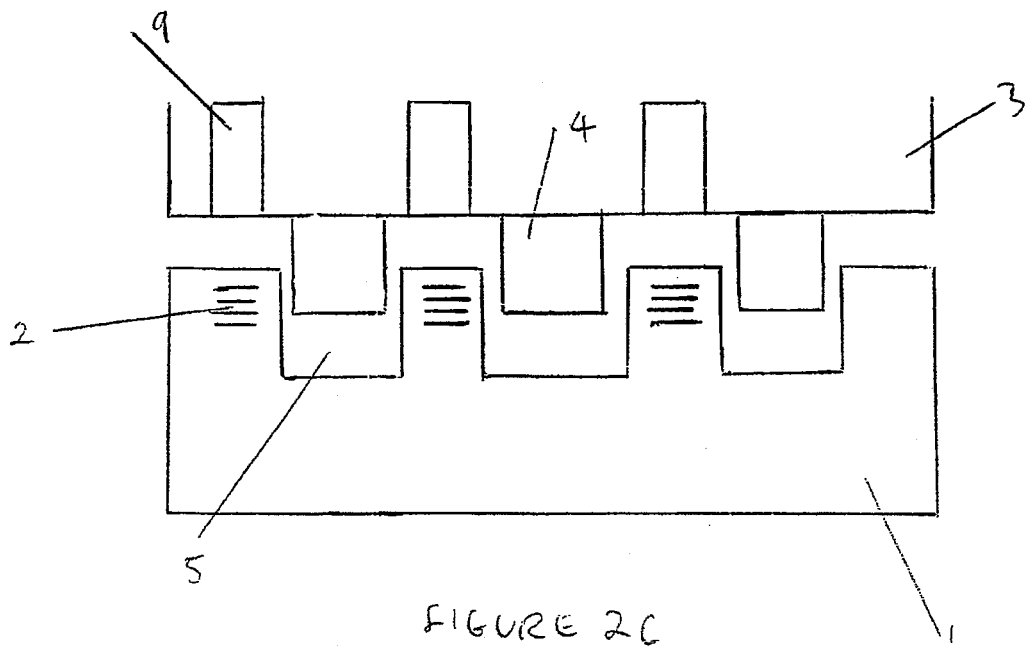

FIGS. 2A to 2C show additional coil 2, magnet 4 and trench 5 arrangements which can be used. In FIG. 2A, a magnet 4 is isolated via an empty trench 5 on either side of the trench 5 occupied by the magnet 4. This helps reduce parasitic and other losses. In FIG. 2B, losses are reduced via metal shields 8 disposed between coils 2. In FIG. 2C, losses are reduced via further trenches 9 formed in the MEMS chip 3 adjacent to coils 2.

Figure 3A:
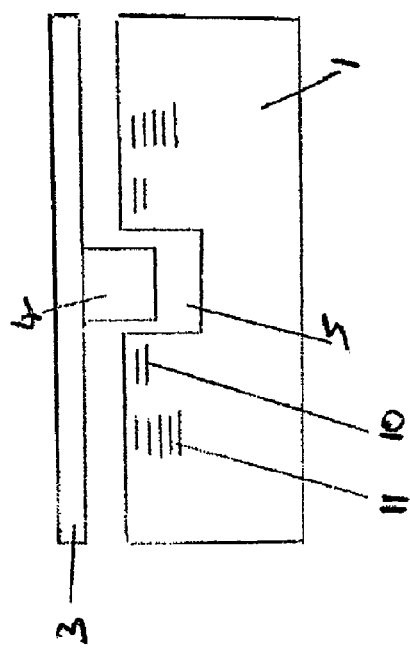
FIGS. 3A and 3B show transformers according to exemplary embodiments of the invention.
Figure 3B:
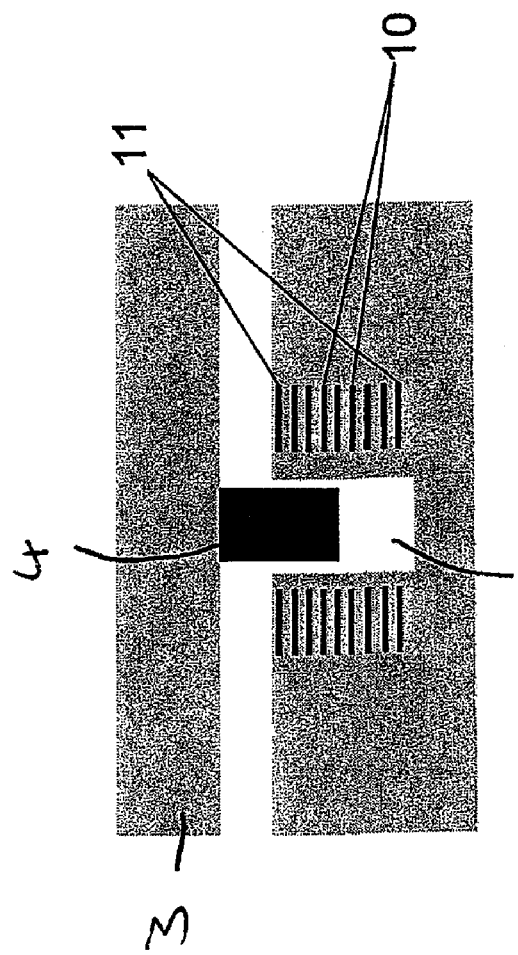

Referring to FIG. 3A, an exemplary micro-transformer according to the present invention has the same form as the micro-generator described above. An exemplary magnet 4 is shown which is accommodated in a trench 5 such that the magnet 4 can move within the trench 5. A set of primary coils 10 surround the magnet 4. A set of secondary coils 11 surround the primary coils 10. The secondary coils 11 have more turns than the primary coils. In this way, the voltage generated by a micro-generator can be increased to a level required for the application to be powered by the micro-generator. FIG. 3B shows another arrangement of the micro-transformer. In the arrangement of FIG. 3B, there is still provided a set of primary coils 10 and a set of secondary coils 11; however, in this case, the two sets of coils 10 and 11 are positioned above one another and interlaced. Generally, the primary coil 10 will have fewer turns (layers) than the secondary coil 11, although the actual number and relative proportions of primary and secondary coils will be dependent upon the particular application and the voltage transformation that is required. Such micro-transformers can be used in conjunction with a micro-generator according to the invention. The transformer can be placed very close to the voltage to be increased in order to minimize losses.

The described micro-generator, preferably in combination with the described micro-transformer, can be used in systems in environments experiencing mechanical vibrations or other dynamic mechanical loads. The micro-generator extracts power from the environment by using the relative motion of magnets 4 and coils 2 caused by the mechanical load. In operation of the example shown in FIG. 1, the mass-spring system 3a, which is the energy pick-up, moves as a result of an external mechanical load and so causes the magnets 4 to move within the trenches 5 to induce a current in the coils 2. In the case where the transformer of FIGS. 3A and 3B is used, a current is induced in the primary coils 10 and is increased by the secondary coils 11.

The energy pick-up 3a has a large sensitivity and moves like a large stiff body ensuring both a large amplitude and the same phase for power generation in each of the serially coupled coils 2.

The example micro-generator shown in FIG. 1 is manufactured by forming the serially coupled coils 2 from aluminum or copper in an IC wafer via an advanced multilayer IC process. Trenches 5 are subsequently formed in the IC wafer via a deep reactive ion etching (DRIE) to allow for magnets 4 to move near the coils 2. A thin film layer of magnetic material such as NiFe81/19 is formed on a MEMS wafer via, for example, sputtering or electroplating. The film layer is patterned and etched to form the micro-magnets 4. The MEMS wafer includes the energy pick-ups. The MEMS wafer is subsequently bonded to the IC wafer and the resulting wafer is diced to form micro-generators as shown in FIG. 1.

The described device makes use of "large" mechanical members for the energy pick-up, such as inertia masses 3a and diaphragms, to maximize energy pick-up, but these are still used at the die level by using the approach of combining MEMS and IC technology. Since standard complementary metal oxide semiconductor (CMOS) or Biplor CMOS (BiCMOS) IC technology is part of the micro-generation system (MEMS), the micro-generator can be combined with a device to be powered at a low cost.

While the invention has been described in detail with reference to specific embodiments thereof, it will be apparent to one of ordinary skill in the art that various changes and modifications can be made therein without departing from the spirit and scope thereof. Accordingly, it is intended that the present invention covers the modifications and variations of this invention provided they come within the scope of the appended claims and their equivalents.

What is claimed is:

1. A method of manufacturing a micro-generator, the method comprising:
    forming an integrated circuit (IC) wafer comprising at least one of: a plurality of first metal coils, a plurality of trenches associated with the first coils, and a layer of magnetic material;
    forming a MEMS wafer, the MEMS wafer comprising a movable micromechanical element and at least one of: a plurality of first metal coils, a plurality of trenches associated with the first coils, and a layer of magnetic material;
    forming a plurality of micro-magnets from the magnetic layer, a micro-magnet being associated with each trench;
    bonding the MEMS wafer to the IC wafer to define a micro-generator wafer such that, in response to the micromechanical element moving, the micro-magnets move within the trenches relative to the first metal coils thereby inducing a voltage in the first metal coils; and
    dicing the micro-generator wafer to form individual micro-generators.

2. The method of manufacturing a micro-generator according to claim 1, wherein the trenches and the first coils are disposed in one of the IC wafer and the MEMS wafer, and the layer of magnetic material is disposed on the other of the IC wafer and the MEMS wafer.

3. The method of manufacturing a micro-generator according to claim 1, wherein the plurality of first metal coils are formed by performing a multilayer IC process.

4. The method of manufacturing a micro-generator according to claim 1, wherein the trenches are formed by performing a deep reactive ion etching.

5. The method of manufacturing a micro-generator according to claim 1, wherein the layer of magnetic material is formed by deposition, plating, or bonding.

6. The method of manufacturing a micro-generator according to claim 1, wherein the micro-magnets are formed by etching or abbreviating the magnetic layer.

* * * * *